United States Patent [19]
Linn et al.
[11] Patent Number: 4,896,394
[45] Date of Patent: Jan. 30, 1990

[54] TOOL WITH EXTENSIBLE HANDLE

[75] Inventors: Richard A. Linn, Minneapolis; Scott R. Parizek, Fridley, both of Minn.
[73] Assignee: Padco, Inc., Minneapolis, Minn.

[21] Appl. No.: 204,500
[22] Filed: Jun. 9, 1988
[51] Int. Cl.$^4$ .......................... B05C 17/02; F16B 7/18
[52] U.S. Cl. .................................. 15/230.11; 15/145; 81/483; 403/299
[58] Field of Search ............................ 15/145, 230.11; 403/299; 16/115, DIG. 19; 81/489

[56] References Cited

U.S. PATENT DOCUMENTS

| | | | |
|---|---|---|---|
| 115,040 | 3/1979 | Dunaway . | |
| 1,662,500 | 3/1928 | Henneck . | |
| 1,937,549 | 12/1933 | Clark et al. . | |
| 3,371,367 | 3/1968 | Tigerman | 15/145 |
| 3,894,807 | 7/1975 | Betz . | |
| 4,003,668 | 1/1977 | Kelly et al. . | |
| 4,194,852 | 3/1980 | Cupp et al. | 403/299 |
| 4,371,282 | 2/1983 | Sturm . | |
| 4,433,931 | 2/1984 | Malish . | |
| 4,524,484 | 6/1985 | Graham . | |
| 4,667,363 | 5/1987 | Calvert | 15/230.11 |
| 4,722,634 | 2/1988 | Malish . | |

*Primary Examiner*—Edward L. Roberts
*Attorney, Agent, or Firm*—Merchant, Gould, Smith, Edell, Welter & Schmidt

[57] ABSTRACT

An insert is disclosed for a tool having a handle extending from a first end adjacent to a free second end. The handle has a hollow bore extending therethrough with an axis of the bore generally aligned with an axis of the handle. The insert includes a body having a longitudinal axis and sized to be inserted within the bore at the free end and moved through the bore to an inserted position adjacent the first end. The longitudinal axis is disposed parallel to the bore axis when the body is in the inserted position. An anchor is provided for fixing the body in the inserted position. The body in the inserted position presents a first surface opposing the bore axis. The first surface is provided with female threads selected to threadedly engage male threads on an end of an extension pole sized to be received within the bore.

12 Claims, 1 Drawing Sheet

TOOL WITH EXTENSIBLE HANDLE

BACKGROUND OF INVENTION

FIELD OF THE INVENTION

This application pertains to tools with handles. More particularly, this application pertains to such tools having means permitting use of an extensible handle. In a preferred embodiment, this application pertains to paint rollers with extensible handles.

Paint rollers having operator engagable handles are old and well known. Examples of such rollers are shown in commonly assigned U.S. Pat. No. 4,254,529 and U.S. Pat. Design 262,075. The aforesaid patents show a paint roller having a hollow handle with a paint roller rotatably connected to the handle and perpendicular thereto. In use of the paint roller, an operator grasps the handle to perform the painting operation.

As discussed in the aforesaid U.S. Pat. No. 4,254,429, an extension pole can be used with the paint roller. The handle bore is recessed such that an extension pole can be forced into the handle and by frictional engagement kept within the handle. Column 3, lines 24–30 of the aforesaid U.S. Pat. No. 4,254,529 notes that the prior art included threaded connectors by which a shielded roller could be attached to an extension pole. However, the aforesaid patent notes that the prior art threaded connectors were cumbersome and often difficult to use.

An example of a threaded connector for use with a paint roller or the like is shown in U.S. Pat. No. 4,194,852 to Cupp, et al., dated Mar. 25, 1980. In Cupp, the threaded connector is exposed at the free end of the handle such that when an extension pole is connected with the handle a moment is generated at the free end.

SUMMARY OF THE INVENTION

According to a preferred embodiment of the present invention, an insert is provided for a paint roller where the roller includes a handle and a roller rotatably mounted perpendicular to the handle. The handle extends from a first end adjacent the roller to a free second end. The handle has a hollow bore with an axis extending generally in alignment with an axis of the handle. The insert comprises a body having a longitudinal axis with the body sized to be inserted within the bore at the free end and moved through the bore to an inserted position adjacent the first end. When the body is in the inserted position, the longitudinal axis is generally parallel to the bore axis Means are provided for fixing the body in the inserted position. When in the inserted position, the body presents a first surface opposing the bore axis. The first surface is provided with female threads selected to threadedly engage male threads on an end of an extension pole which is sized to be received within the bore.

DESCRIPTION OF THE PREFERRED EMBODIMENT

Figure 1:
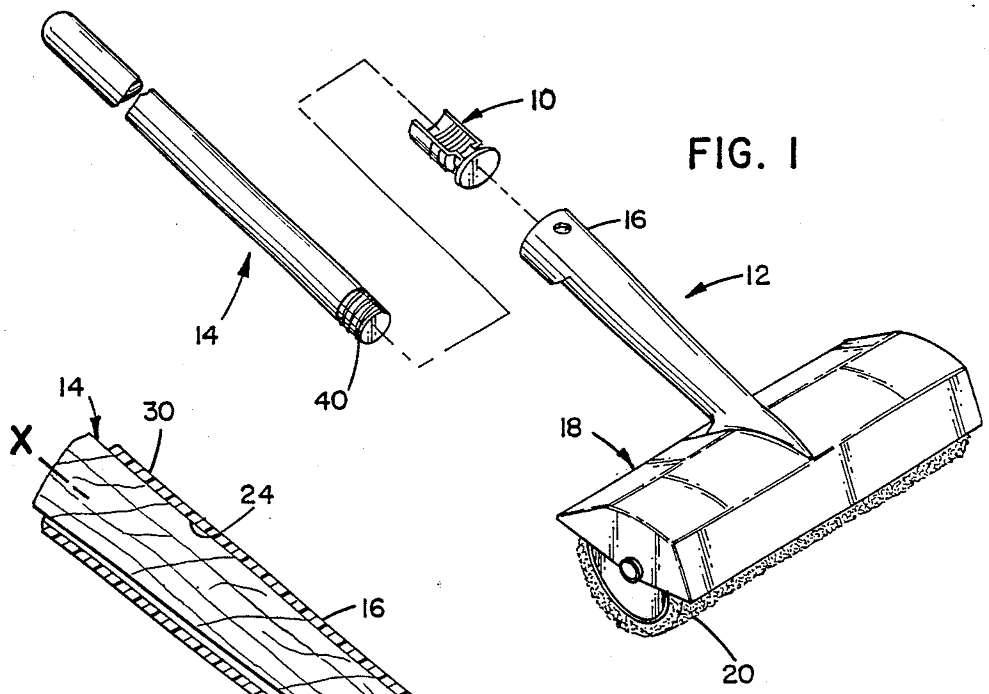
FIG. 1 is an exploded view taken in perspective showing a paint roller, an insert according to the present invention and an extension pole.
Figure 2:
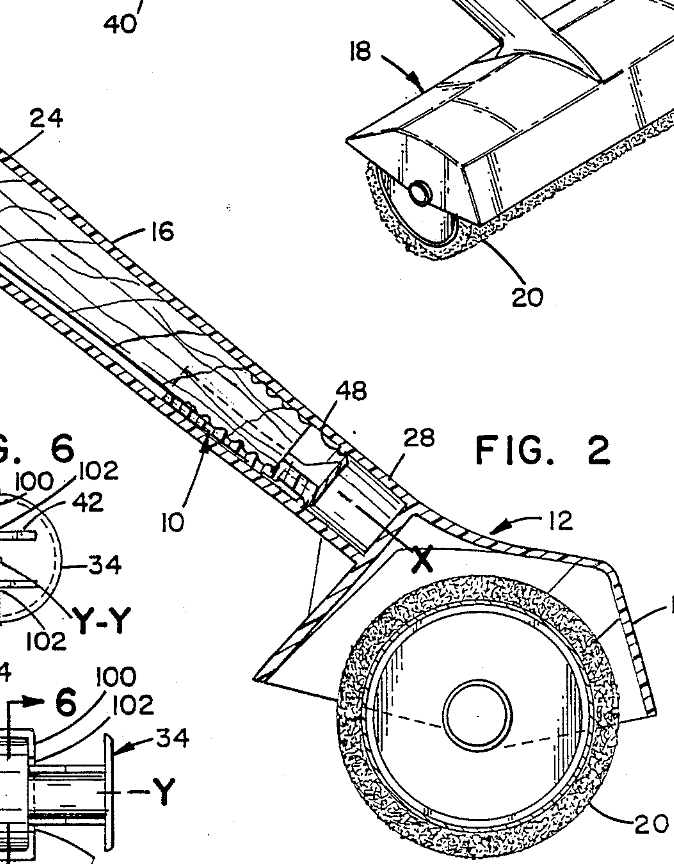
FIG. 2 is a cross-sectional view taken in elevation of the combination of a paint roller, a threaded insert and an extension pole.
Figure 6:
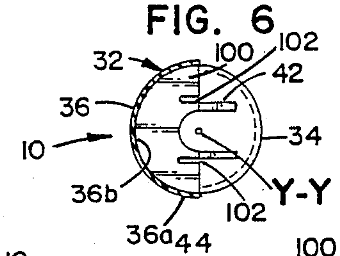
FIG. 6 is a view taken along lines 6—6 of FIG. 3.

According to several figures in which identical elements are numbered identically throughout, a description of the preferred embodiment of the present invention will now be set forth. The present invention is an insert 10 for use with the shielded paint roller 12 and an extension pole 14. While use of the insert 10 for a paint roller 12 is a preferred use, it will be appreciated that the insert 10 is equally suitable for any tool having a hollow handle.

The shielded paint roller 12 includes a handle 16 and a shield 18. The shield is intricately molded to the handle 16 and carries a roller 20 with the roller 20 rotatable about its cylindrical axis generally perpendicular to an axis X—X of a bore 24 extending through handle 16.

Handle 16 extends from a first end 28 to a free second end 30 with bore 24 extending completely through handle 16 and exposed through second end 30. Bore 24 tapers from a largest diameter at second end 30 to a narrowest diameter at first end 28. It will be appreciated that a shielded paint roller such as roller 12 with a handle, shield and bore so far described forms no part of this invention per se and may be such as that shown and described in U.S. Pat. No. 4,254,529.

Figure 3:
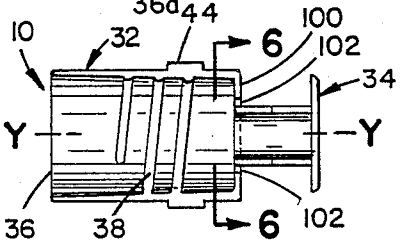
FIG. 3 is a top plan view of an insert according to the present invention.
Figure 4:
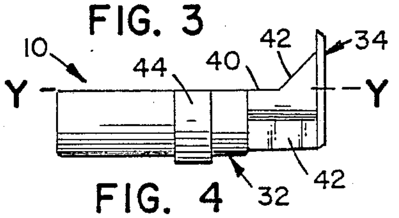
FIG. 4 is a side view of the insert of the present invention.
Figure 5:
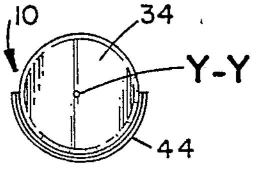
FIG. 5 is an end view of an insert of the present invention.

Insert 10 includes an insert body 32 and a disc shaped anchor 34. Body 32 includes a thin, semicylindrical wall 36 having a longitudinal cylindrical axis Y—Y. Thin wall 36 has a convex cylindrical outer surface **36*a* and a concave cylindrical inner surface 36*b*. Surface 36 is smooth and sized to generally conform with bore defining surfaces of handle 16 when the insert 10 is disposed in an inserted position, as will be described. Surface 36 is provided with female threads 38 which are selected to threadedly engage male threads 40 of extension pole 14 when extension pole 14 is actually aligned with longitudinal axis Y—Y. Preferably, either the portion of pole 14 with threads 40 or body 32 with threads 38 are tapered so that threading of pole 14 into body 32 causes body 32 to expand. In FIG. 3, a tapered embodiment of body 32 is shown, with body 32** narrower at an end adjacent the handle first end in the inserted position.

Disc anchor 34 is connected to insert body 32 by intermediate semi-cylindrical connector 40. Intermediate semi-cylindrical connector 40 has its cylindrical axis being aligned with the axis Y—Y of body 32. Intermediate semi-cylindrical connector 40 extends axially away from an axial face 100 of body 32. Two slots 102 are formed through face 100 on opposite sides of semi-cylindrical connector 40. Disc 34 extends generally perpendicular to axis Y—Y with disc 34 retained in generally rigid perpendicular alignment by bracing ribs 42. Slight flexing of disc 34 relative to axis Y—Y is desired so that insert 10 is not easily pulled from a handle.

Preferably, insert 10 is formed of unitary construction from injection molded plastic as is handle 16. A friction ring 44 surrounds exterior surface 36 to provide friction against the interior surface of handle 16 as will be described.

Disposed on the bore defining surfaces of handle 16 adjacent first end 28 is a retaining ring 48. Ring 48 is sized to have a diameter slightly smaller than the diameter of disc 34. The diameter of bore 24 on a side of retaining ring 48 opposite first end 28 is sized to pass disc 34. The size of the diameter of the bore 16 opposite containing ring 48 is sized so that anchor 34 cannot be easily urged further toward free end 28.

Upon insertion of the insert 10 into bore 24, the insert 10 can be pushed to ring 48. As the insert 10 is inserted, slots 102 permit semi-cylindrical connector 40 to flex relative to body 32. When disc 34 achieves the location of ring 48, an operator, by engaging either an extension pole or other devise to continue urging of insert 10, can urge disc 34 past ring 48 such that disc 34 is locked on the side of ring 48 adjacent first end 28. In this position, the insert 10 is now locked in an inserted position with the insert 10 adjacent end 28. Ring 48 is not essential to operation but is preferred to insure a tight lock of insert 10 within handle 16. Friction ring 44 accomodates fluctuations in bore diameters to insure a snug fit of insert 10 within a handle bore.

An extension pole can now be used with the pole having its threads 40 engaging threads 38. An advantage of the present construction is that the threaded location is well within the bore such that any torque or moment is taken up along the length of the bore rather than at the end as would be the case in the aforementioned U.S. Pat. No. 4,194,852.

From the foregoing detailed description of the present invention, it has been shown how the objects of invention have been attained in a preferred manner. However, modifications and equivalents of the disclosed concepts such as readily occur to those skilled in the art are intended to be included in the scope of this invention. Thus, the scope of the invention is intended to be limited only by the scope of the claims as are, or may hereafter be, appended hereto.

I claim:

1. An insert for a tool having a handle extending from a first end to a free second end, said handle having a hollow bore extending therethrough with an axis of said bore generally aligned with an axis of said handle and having a reduced diameter portion generally near said first end, said bore extending through said free end and exposed to an exterior of said handle, said insert comprising:

an insert body having a longitudinal axis, said body sized to be inserted within said bore at said free end and moved through said bore to an inserted position adjacent said first end, said longitudinal axis disposed generally parallel to said bore axis when said body is in said inserted position;

affixing means for fixing said body in said inserted position, said affixing means including a disc connected to said body disposed generally perpendicular to said longitudinal axis, said disc having a diameter greater than said reduced diameter bore portion but said disc being slightly flexible to permit said disc to move past said reduced diameter portion as said body is moved into said inserted position.

2. An insert according to claim 1 wherein said body is semi-cylindrical with a semi-cylindrical second surface disposed opposing a bore defining surface of said handle, said second surface frictionally engaging said handle.

3. An insert according to claim 2 wherein said body comprises a thin wall having said semicylindrical second surface and said threaded first surface.

4. An insert according to claim 2, wherein said second surface includes a friction ring projecting outwardly therefrom for frictionally engaging said handle bore.

5. An insert according to claim 1 wherein said tool is a paint roller with a roller rotatably mounted generally perpendicular to said handle.

6. An insert for a tool according to claim 1, wherein said disc is connected to said body at a leading edge of said body.

7. A pain roller comprising:

a handle having a first end and a second end with a hollow bore extending therethrough and including a reduced diameter bore portion adjacent said first end, an axis of said bore generally aligned with an axis of said handle;

a roller rotatably mounted generally perpendicular to said handle;

an insert having an insert body with a longitudinal axis, said body sized to be inserted within said bore at said free end and moved through said bore to an inserted position adjacent said first end, said longitudinal axis disposed generally parallel to said bore axis when said body is in said inserted position;

affixing means for fixing said body in said inserted position, said affixing means including a disc connected to said body disposed generally perpendicular to said longitudinal axis, said disc having a diameter greater than said reduced diameter bore portion, but said disc being slightly flexible to permit said disc to move past said reduced diameter portion as said body is moved into said inserted position; and said body in said inserted position presenting a first surface opposing said bore axis, said first surface provided with female threads selected to threadedly engage male threads on an end of an extension pole sized to be received within said bore.

8. A paint roller according to claim 7 wherein said body has semi-cylindrical second surface disposed opposing a bore defining surface of said handle.

9. A paint roller according to claim 8 wherein said body comprises a thin arcuate wall having said semi-cylindrical second surface and said threaded first surface.

10. An insert according to claim 7 wherein said insert is tapered to expand upon threading of said pole into said insert.

11. A pain roller according to claim 7 wherein said pole is tapered for said insert to expand upon threading of said pole into said insert.

12. An insert according to claim 7, wherein said disc is connected to said body at a leading edge of said body.

* * * * *

UNITED STATES PATENT AND TRADEMARK OFFICE

CERTIFICATE OF CORRECTION

PATENT NO. : 4,896,394

DATED : January 30, 1990

INVENTOR(S) : Richard A. Linn, et al.

It is certified that error appears in the above-identified patent and that said Letters Patent is hereby corrected as shown below:

Column 4, line 17 "pain" should be --paint--;

Column 4, line 55 "pain" should be --paint--.

Signed and Sealed this

Thirtieth Day of April, 1991

*Attest:*

HARRY F. MANBECK, JR.

*Attesting Officer*

*Commissioner of Patents and Trademarks*